United States Patent [19]
Schäfer

[11] 3,983,436
[45] Sept. 28, 1976

[54] ELECTRIC ARC DISCHARGE LAMP

[75] Inventor: Fritz Peter Schäfer, Goettingen-Nikolausberg, Germany

[73] Assignee: Max-Planck-Gesellschaft zur Forderung der Wissenschaften e.v, Goettingen, Germany

[22] Filed: Dec. 4, 1975

[21] Appl. No.: 637,651

[30] Foreign Application Priority Data
Dec. 19, 1974 Germany............................ 2460277

[52] U.S. Cl................................. 313/35; 313/30; 313/231.7
[51] Int. Cl.² ........................................ H01J 61/52
[58] Field of Search ............... 313/35, 32, 30, 231.7

[56] References Cited
UNITED STATES PATENTS
3,366,815  1/1968  Anderson............................ 313/35 X

*Primary Examiner*—R. V. Rolinec
*Assistant Examiner*—Darwin R. Hostetter
*Attorney, Agent, or Firm*—Flynn & Frishauf

[57] ABSTRACT

To permit high density of light output, for example in the order of 400kW/cm³ required to stimulate lasers, the arc is stabilized by generating the arc inside a transparent tube, the inner surface of which is covered with a film of liquid, such as water, or an aqueous metal salt solution, the liquid being supplied through one electrode secured in a rotatable holder to which the tube is attached, to a rotatable receiver holder in which the other electrode is located, the liquid then draining away. Rapid rotation of the tube adheres the liquid by centrifugal force to the inner surfaces of the tube.

10 Claims, 1 Drawing Figure

U.S. Patent  Sept. 28, 1976  3,983,436
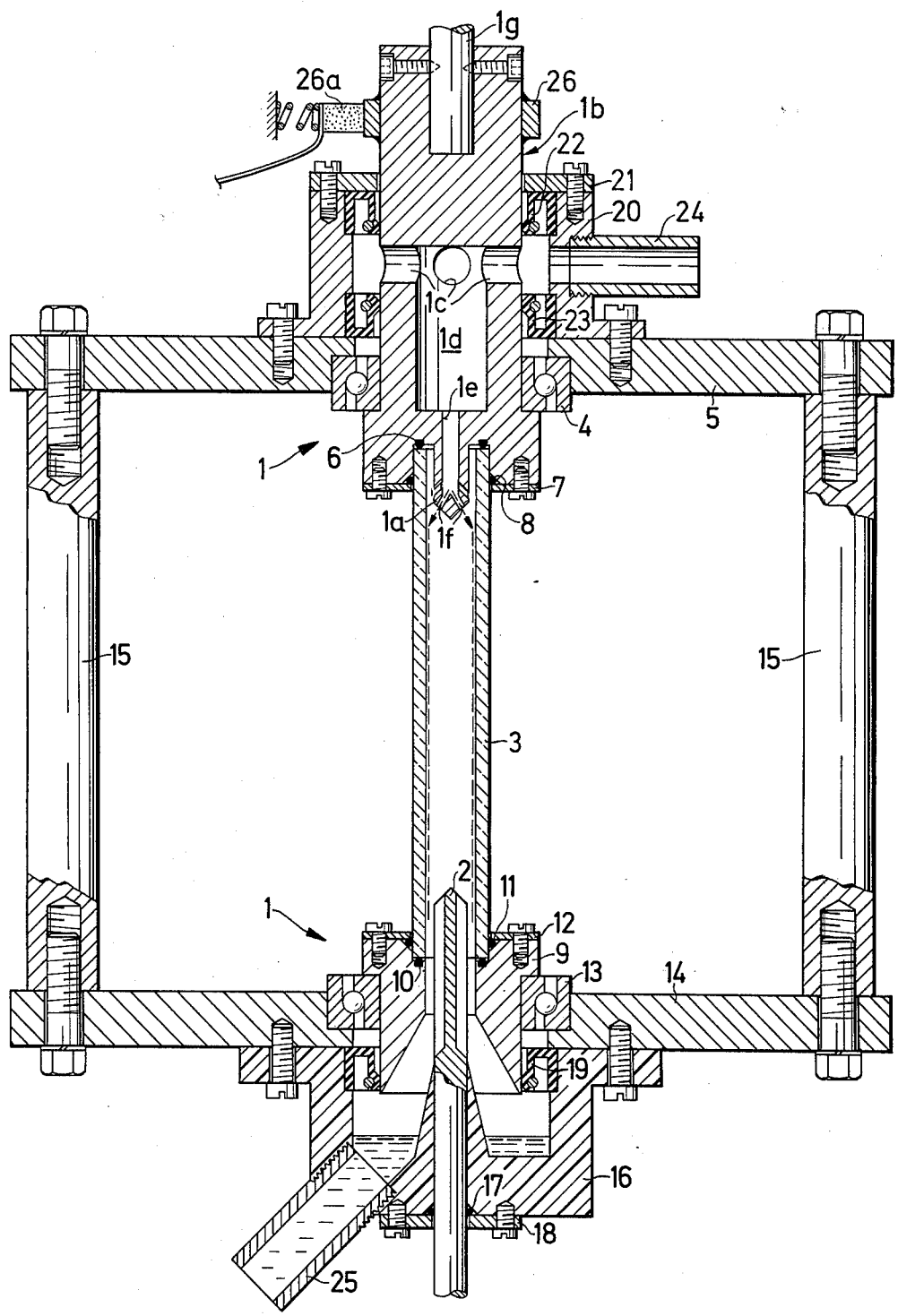

ELECTRIC ARC DISCHARGE LAMP

The present invention relates to an electric arc discharge lamp having two electrodes, and more particularly to such a lamp which is capable of emitting light at extremely high power densities, for example, to stimulate laser operation.

Sources of optical radiation with extremely high density of emitted radiation are required to stimulate various types of lasers using colored, or pigmented materials. For example, one typical type of laser requires a density of power to be absorbed in the liquid solution providing the lasing effect in the order of about 4kW/cm$^3$ (see, for example, B. B. Snavely, Proc. IEEE 57 (1969), 1374–1390). The efficiency of conversion of electrical power to optical radiation capable of being absorbed by the laser material is usually less than one percent. To provide for the optical power input of 4kW/cm$^3$, then, requires a radiation source having power capabilities in the order of at least 400kW/cm$^3$.

It has previously been proposed to stabilize electrical discharge arcs by means of rotating films, or bodies of water, in order to obtain a higher density of output (see, for example, F. Burhorn, H. Maecker, Z. Physik 129 (1951), 369–376). The eddy, or rotation of water is generated by applying water, tangentially, to the interior of a fixed tube between which the electrodes are located. The water, applied tangentially, then passes along the interior of the tube in spiral paths to the ends of the tube, where it splashes off. The funnel or core of the water tube, formed along the axis of the tube then provides space for the electrical arc. The supply lines for the water interfere with proper light transmission, and the water splashing from the ends of the tubes is particularly annoying in operation.

It has also been proposed to construct a water-stabilized electrical arc discharge lamp to stimulate lasers by using a flash lamp which is almost entirely filled with water or a colored liquid. The flash lamp is rapidly rotated about its longitudinal axis, so that along the axis of rotation a thin channel, or duct-like space will form which is filled with air or water vapor, located between the electrodes (see: C. M. Ferrar, Appl. Phys. Lett. 20 (1972), pp. 419–420). Such an arc discharge lamp is not suitable for continuous operation since the discharge conditions rapidly deteriorate due to dissociation products occurring to the generation of the arc. Further, high heat levels must be removed, and dissipated.

It is an object of the present invention to provide an electric arc discharge lamp capable of generating light output at extremely high light density, which is, for example, suitable for continuous operation of lasers.

SUBJECT MATTER OF THE PRESENT INVENTION

Briefly, two electrodes are located coaxially with a transparent tube, the tube confining an electric discharge arc therebetween. A layer of liquid is generated at the inner wall of the tube, by rotating the tube about its axis. The tube is retained in rotatable tube holder fittings, one of them also holding one electrode, which is preferably hollow and formed with nozzle openings through which the liquid is supplied and conducted to the inner tube wall surface, the other tube holder being rotatably located in a holder base, and having the second electrode extending therethrough, while providing fluid tight, yet rotatably arranged sealed ducts to carry away liquid which is supplied through rotatable — yet sealed — duct connections to the first tube holder.

The arc lamp according to the present invention permits use of electrical current densities of over 10 MW/cm$^3$. The efficiency of conversion of electrical input to effective light, or radiation output can be increased by utilizing particular substances for the liquids flowing along the inner surface of the transparent tube. These particular liquids may, for example, be aqueous solutions of one or more metal salts, particularly salts of heavy metals, which may provide an emission spectrum matched to the particular material of the laser which is to be stimulated.

The invention will be described by way of example with reference to the accompanying drawing, wherein the single drawing is a schematic longitudinal cross sectional view through the electrode arrangement and the fluid stabilization of the arc which can be formed between the electrodes.

The arc lamp has three basic components:
1. A rotating arrangement 1 which has a rotating electrode 1a located thereon;
2. A fixed electrode 2; and
3. A tube of quartz glass 3.

The axis of rotation is essentially congruent with the axes of the electrodes 1a, 2 and of the tube formed by the quartz glass 3. Preferably, the axis is vertical, as shown in the FIGURE.

The rotating part 1 and the electrode 1a may be one single integral element, made, for example, of copper. It is journalled by means of a ball bearing 4, which has inclined axis of rotation, in a first, or upper base plate 5. The quartz glass tube 3 is seated in a suitable groove or notch of the rotating element 1, and held therein, in sealed condition, by an end O-ring 6 and by a lateral O-ring 8, pressed against the tube by a metal ring 7. Quartz glass tube 3 thus is held sealed, yet resiliently supported. The lower end of the quartz glass tube 3 is seated in a suitably formed metal element 9, held in position by an end O-ring 10 and sealed by a lateral O-ring 11 held in position by a metal ring 12. The metal element 9 is journalled by means of a ball bearing 13 with inclined ball rotation axes in a second, or lower base plate 14. The base plates 5 and 14 are held in spaced conditions by spacer bolts 15. The lower, fixed electrode 2 is centrally seated in a cup-shaped element 16, made, for example of plastic. It is held in the cup-shaped part 16 by means of an O-ring 17, secured in position by a clamping ring 18, attached to the plastic part 16, so that the electrode is securely held in sealed condition. The metal element 9 rotates with the tube 3. It is sealed against the plastic part 16 by means of a reentrant sealing ring 19.

The rotating part 1 has an extension portion 1b which is surrounded by a cup-shaped metal part 20, secured to the upper base plate 5. The metal part 20 has an appetured cover 21, through which the upper part 1b of the rotating element 1 passes. The metal part 20 is sealed with respect to the rotating portions by means of re-entrant seals 22, 23. A supply tube 24 for liquid for cooling of the tube 3 and to stabilize the arc is connected to the metal part 20. The usual type of liquid used will be water, or an aqueous solution. The supply tube 24 is tightly connected to part 20, for example, by a screw connection. The liquid is drained from the tube 3 through a drain pipe 25 which has a substantially greater diameter than the interior diameter of the supply tube 24. Drain pipe 25 is secured to the lower portion of the plastic part 17 adjacent the lower electrode.

Operation: Liquid is supplied through duct 24 and flows through the duct into the chamber defined by the metal portion 20. It then reaches a chamber 1d through radial bores 1c formed in the rotating part 1, to then pass through an axial bore 1e into the electrode 1a. Electrode 1a is formed with tangential, inclined nozzle-type openings 1f at the end thereof, ejecting the fluid inclined direction and tangentially towards the inner wall of the quartz glass tube 3. The fluid will thus have both axial as well as tangential components, and flow in spiral paths along the inner wall of the quartz glass tube 3 downwardly to flow through the conically increasing portion of the rotating metal part 9 (see the FIGURE), splashing off the rotating portion and being caught by the plastic part 16 for further drainage through duct 25. The thickness of the layer of liquid which covers the entire inner surface of the quartz glass tube 3 can be varied and controlled by suitable selection of the shape and size of the nozzle openings 1f in the electrode 1a; by varying the speed of flow of the fluid; and by varying the speed of rotation of the rotating portions of the arc lamp. The diameter of the axial ducts which will be available to form the arc can thus be easily controlled. In a preferred form, the inner surface of the quartz glass tube 3 is slightly conically expanded from the direction of electrode 1a to the electrode 2; such conical expansion increases the axial feed component of the stream of fluid to such an extent that the lamp can be operated in random position between the vertical position, as shown, and an entirely horizontal position.

Electrical power is supplied to the upper portion 1b of the rotating arrangement 1 by means of a slip ring 26, engaged by a brush 26a. The upper portion of the rotatable arrangement 1 is formed with an axial bore 1g for the shaft of a drive motor, not shown. This shaft may have an insulating coupling applied thereto.

The arc discharge lamp is started as follows:

The system of electrode fitting 1, transparent tube 3 and lower fitting 9 is rotated; liquid is applied so that a film will form at the inner surface of tube 3, defining a duct, or discharge path axially thereof of a suitable thickness. The rod-shaped lower electrode 2 is then moved in contact with electrode 1f. Preferably, plate 18 is not completely tightened against O-ring 17 to permit such relative movement. An appropriately dimensioned series resistor, connected in series with the electrodes limits current flow to a predetermined desired design value. The lower electrode is then pulled away from the fixed electrode 1a, to strike an arc, which will form in the rotating liquid. Further lowering (with reference to the figure) of the electrode 2 to a desired length effects completion of starting. The series resistor may be suitable changed so that the desired current is taken by the lamp. The rising branch of the characteristics of the arc can be used to adjust the series resistor in such a way that, eventually, the power lost therein is practically completely eliminated; thereafter, the desired current can be adjusted by adjusting the voltage of operation of the lamp.

Extremely high power conversion can be effected by the lamp, since both electrodes as well as the tube of quartz glass are intensively cooled by the continuously flowing liquid. Even low flow speeds and quantities permit conversion densities of over 10MW/cm$^3$. A typical lamp constructed in accordance with the Figure may have an electrode distance, in operation, of about 10cm; the inner diameter of the quartz glass tube can be about 14½ mm. By suitable increase of all the dimensions, power input with similar power conversion density can be increased. Any products which might absorp radiation and arising due to the burning of the electrode, or dissociation of the liquid or fluid are immediately flushed away due to the axial component of fluid flow. Thus, the quartz glass tube will not darken, or become dull and changes in the electrical characteristics of the arc are inhibited.

Various types of fluids may be used; pure water is a simple fluid; however, aqueous solutions of metal salt, particularly salts of heavy metals can also be used. Vapor from these solutions will reach the electrical arc, where the metal salts evaporate and dissociate. The metals are then stimulated to emission. By adding, for example, thallium salt, it is possible to obtain practically complete acceptance of current by thallium ions. Thallium has, like most metal salts, a lower ionization energy than hydrogen or oxygen atoms in a water vapor plasma. An emission spectrum can, thereby be obtained which essentially consists only of a group of lines at 378nm., and of the well known green thallium line at 537nm. Similarly, by adding sodium salt, emission can be restricted essentially to the lines at 589nm. By suitable selection of the salts, or combination of salts, an emission spectrum can be devised which is highly reproducable and which can remain constant and unvarying for practically unlimited periods of time, to be matched, for example, to a predetermined absorption spectrum of a certain colored laser solution to be stimulated.

The emission spectrum of the lamp can further be influenced by adding dissolved or suspended absorbing substances to the solution applied as a layer to the inner surface of tube 3. For example, copper sulfate, or aromatic compounds may be added to absorb a large portion of the ultraviolet spectral parts of radiation, and thus render these radiation components ineffective.

Organic coloring pigments, or other coloring additives which have high fluorescence, for example, an aqueous solution may also be used, functioning as quantum converters to transform the emission of the lamp from a short wave spectral region to a long wave spectral region by means of a Stokes-shift.

Various changes and modifications may be made within the scope of the invention.

I claim:

1. Electric arc discharge lamp having two electrodes (1a, 2) defining therebetween an arc discharge path;

a tube (3) transparent to the light of the arc discharge surrounding the electrodes and confining the arc discharge therein;

and means generating a layer of liquid on the inner wall of the tube, which layer rotates about the axis of the tube, said lamp further comprising a rotatable tube holder fitting (1) holding the tube sealed therein to rotate therewith, said fitting carrying a first one of the electrodes (1a) located to extend into the tube (3);

a liquid supply duct (1c, 1d, 1e) formed in the fitting in fluid communication with the interior of the tube (3);

liquid supply means (20, 24) relatively rotatable and sealingly located adjacent the rotatable fitting and in fluid communication with the liquid supply duct;

and a rotatable drain fitting (9–12) secured to the other end of the tube formed with drain ducts to drain liquid from the tube.

2. Arc lamp according to claim 1, wherein the first electrode (1a) is hollow and in fluid communication with the duct (1c, 1d, 1e) in the tube holder fitting (1), said electrode (1a) being formed with nozzle openings (1f) at the end thereof extending into the tube.

3. Arc lamp according to claim 2, wherein the nozzle openings (1f) extend in a direction which is axially inclined and tangential to the inner wall of the tube (3).

4. Arc lamp according to claim 2, further comprising a stationary tube fitting holder (20) having a liquid supply chamber formed therein, said tube fitting (1) carrying the first electrode (1a) extending through the tube fitting holder;

said tube fitting (1) being fluid sealed and rotatably secured therein.

5. Arc lamp according to claim 4, wherein the tube fitting (1) is a cylindrical element secured and sealed to the tube (3) and journalled in the holder (20), and a re-entrant seal (22, 23) sealing the cylindrical element (1) to the holder (20) while permitting relative rotation.

6. Arc lamp according to claim 1, further comprising a stationary drain fitting holder (16) having a drain chamber formed therein, the other electrode (2) extending through said drain fitting holder;

said drain fitting (9–12) being fluid sealed and rotatably secured therein.

7. Arc lamp according to claim 6, wherein the drain fitting comprises a rotatable ring-shaped element (9) secured to the tube (3) and journalled in the holder (16);

and a re-entrance seal (19) sealing the ring-shaped element (9) to the holder (16) while permitting relative rotation.

8. Arc lamp according to claim 1, wherein the liquid introduced through the liquid supply duct and to flow at the interior surface of the tube comprises an aqueous metal salt solution.

9. Arc lamp according to claim 1, wherein the liquid introduced through the liquid supply duct and to flow at the interior surface of the tube comprises a liquid comprising absorbing substances dissolved, or suspended therein to absorb radiation in certain predetermined emission spectra bands upon operation of the arc of the arc lamp.

10. Arc lamp according to claim 1, wherein the liquid introduced through the liquid supply duct and to flow at the interior surface of the tube comprises a liquid with organic dyes added thereto, exhibiting fluorecence and functioning as a quantum converter to shift the spectral range of emission of the arc upon operation of the lamp.

* * * * *